United States Patent [19]

Ford

[11] Patent Number: 4,784,378
[45] Date of Patent: Nov. 15, 1988

[54] VIBRATING BODY MOUNTING ASSEMBLY

[75] Inventor: David M. Ford, Northville Township, Wayne County, Mich.

[73] Assignee: Ford Motor Company, Dearborn, Mich.

[21] Appl. No.: 798,086

[22] Filed: Nov. 14, 1985

[51] Int. Cl.$^4$ .................... F16M 5/00; F16M 13/00; B60G 15/04
[52] U.S. Cl. .................... 267/219; 248/562; 248/636; 267/140.1
[58] Field of Search ............. 267/8 R, 8 B, 8 C, 8 D, 267/8 A, 9 R, 9 B, 9 A, 9 C, 10, 35, 64.28, 122, 140.1, 140.3, 152, 64.14, 219, 186; 180/312; 248/562, 636, 638, 659, 363; 280/708, 710, 712; 188/269, 352, 322.11, 322.21, 356; 60/407, 411

[56] References Cited

U.S. PATENT DOCUMENTS

| | | | |
|---|---|---|---|
| 1,655,204 | 1/1928 | Stevens | 267/35 |
| 1,855,064 | 4/1932 | Messier | 188/269 |
| 2,038,968 | 4/1936 | Summers | 267/35 X |
| 2,165,501 | 7/1939 | Nowak | 188/269 |
| 2,181,073 | 11/1939 | Schafer et al. | 188/352 |
| 2,705,118 | 3/1955 | Beck | 267/140.1 X |
| 3,112,923 | 12/1963 | Ley | 280/708 X |
| 3,282,542 | 11/1966 | Goodwin et al. | 248/631 |
| 3,363,893 | 1/1968 | Goddard | 267/64.14 |
| 3,661,236 | 3/1972 | Wossner | 188/269 X |
| 3,947,007 | 3/1976 | Pelat | 267/136 |
| 4,153,227 | 5/1979 | Gamaunt | 248/631 |
| 4,154,206 | 5/1979 | Le Salver et al. | 267/35 |
| 4,159,091 | 6/1979 | Le Salver et al. | 248/562 |
| 4,161,304 | 7/1979 | Brenner et al. | 248/562 |
| 4,352,487 | 10/1982 | Shtarkman | 267/140.1 X |
| 4,469,316 | 9/1984 | van den Boom et al. | 267/140.1 |
| 4,511,126 | 4/1985 | Bernuchon et al. | 267/140.1 |
| 4,618,129 | 10/1986 | Bechu | 267/140.1 |
| 4,650,169 | 3/1987 | Eberhard et al. | 267/140.1 |

FOREIGN PATENT DOCUMENTS

| | | |
|---|---|---|
| 2712641 | 9/1978 | Fed. Rep. of Germany ... 267/140.1 |
| 3245653 | 6/1984 | Fed. Rep. of Germany ... 267/140.1 |
| A3509000 | 9/1985 | Fed. Rep. of Germany . |
| 1494326 | 7/1967 | France . |
| A2564929 | 11/1985 | France . |
| 123033 | 9/1980 | Japan . |
| 144839 | 8/1984 | Japan ............... 267/140.1 |
| 556307 | 9/1943 | United Kingdom ............... 188/356 |

Primary Examiner—Andres Kashnikow
Assistant Examiner—Robert J. Oberleitner
Attorney, Agent, or Firm—Peter D. McDermott; Roger L. May

[57] ABSTRACT

An assembly is disclosed for mounting a vibrating body to a support structure, being particularly adapted for use as an engine mount system for a motor vehicle. The assembly comprises a mount having a chamber which, in use, is fluid-filled, and further comprises a vacuum accumulator in fluid communication with the mount chamber. More specifically, the mount comprises (a) a housing comprising a substantially rigid wall with a first opening therethrough and a first elasticly deformable body sealingly bonded to the wall to form a fluid-tight closure of such first opening, the housing defining an elasticly expandable fluid-tight chamber with a first port, such chamber being in fluid communication with the vacuum accumulator through such first port via a fluid conduit; (b) a rigid attachment of the housing wall to either the vibrating body or the support structure; and (c) an attachment of the mount to the other of the vibrating body and support structure, which attachment is to the elastomeric body. Each vacuum accumulator comprises a housing defining a fluid-tight vacuum chamber with a fluid port and a pressure regulation port. The fluid port is in fluid communication with the first port of the mount chamber through the fluid conduit. The pressure regulation port is adapted to be in communication with a device or apparatus for regulating pressure within the vacuum chamber.

16 Claims, 3 Drawing Sheets

VIBRATING BODY MOUNTING ASSEMBLY

RELATED APPLICATIONS

This application is related to and commonly assigned with copending U.S. patent application Ser. No. 685,690 filed Dec. 14, 1984, now U.S. Pat. No. 4,679,759 entitled Assembly For Mounting a Vibrating Body.

BACKGROUND OF THE INVENTION

The present invention relates to an apparatus or assembly for mounting a vibrating body to a support structure. More specifically, the invention relates to a mounting device employing a fluid active mount to mount a body or mass subject to vibrational excitations to a frame or support structure, with damping or isolation of such excitations. The invention is particularly suitable for use in mounting an internal combustion engine to a motor vehicle frame or body.

In mounting a vibrating body to a support structure, such as in mounting an internal combustion engine to the frame or unibody of a motor vehicle, it long has been known to employ elastomeric block structures as mounting devices to provide isolation (reduced transmissibility) and/or damping of the vibrations generated by or induced in the body. Difficulty exists, however, in effectively damping or isolating the broad range of vibrational frequencies and amplitudes generated by an internal combustion engine. One significant difficulty lies in that the vibration damping provided by known elastomeric engine mounts varies proportionately with the transmissability of vibration by such engine mount. A relatively hard elastomer will provide good damping of high amplitude vibrations, but is relatively ineffective to damp low frequency low amplitude vibrations such as vibrations during engine idle. On the other hand, relatively soft elastomeric mounts, while better able to isolate low frequency low amplitude vibrations, would be relatively ineffective to damp or isolate higher amplitude vibrations.

An effective engine mounting device is needed, therefore, to damp or isolate a broad range of vibrational modes and a broad range of vibration frequencies and amplitudes. Thus, for example, an internal combustion engine will produce relatively low frequency, low amplitude torque pulses during engine idle. Larger amplitude torques are generated during clutch release and rapid acceleration. In addition, substantially vertical vibrational modes may include low amplitude, high frequency vibrations, such as those generated by powertrain deformations and second order unbalanced inertia forces typical in four cylinder engines. Also, large amplitude essentially vertical vibrations must be damped, such as those generated by large amplitude powertrain deflections and even externally caused vibrations such as those induced in a motor vehicle engine by the collision the vehicle's tires with road obstructions, potholes, etc. It is an object of the present invention to provide a mounting system which provides damping and isolation substantially effective for a broad range of vibrational amplitudes.

Known motor vehicle engine mounting systems and devices have proven unsatisfactory and, in particular, have not been sufficiently effective in damping or isolating the broad range of vibration frequencies and amplitudes generated in normal use of a motor vehicle. In U.S. Pat. No. 4,159,091 to LeSalver et al. is disclosed a damping device for suspension of a motor vehicle engine. The device is relatively complex, having two internal chambers, the first of which and at least a portion of the second of which chambers are filled with liquid, a partition wall with a calibrated orifice dividing the two chambers. A somewhat similar approach is suggested in U.S. Pat. No. 4,352,487 to Shtarkman, wherein a shock absorber is shown to have inner and outer rigid members connected by an elastomeric shear spring and having a main fluid chamber disposed between the two rigid members in fluid communication through a restricted orifice to a second fluid chamber within the inner rigid member. A third chamber is provided, specifically an elastomeric bladder within the second fluid chamber, which is selectively chargeable with gas pressure for calibrating the damping characteristics of the device. In addition, a fourth chamber is provided, specifically an elastomeric diaphragm is included in the main fluid chamber to provide a selectively chargeable gas chamber. Another elastomeric engine mount with hydraulic damping is shown in U.S. Pat. No. 4,161,304 to Brenner et al. The engine mount thereof includes an elastic peripheral wall joined with metallic end walls to form a liquid-filled main chamber and a liquid-filled auxiliary chamber. The two metallic end walls are rigidly connected. The peripheral walls function as thrust springs. The partition between the two liquid-filled chambers is said to be either rigid and stationery or moveable. An engine mount of this kind is said to be suitable to strongly damp lower frequency, high amplitude oscillations of the engine while allowing high frequency oscillations with low amplitude to pass undamped.

Early attempts were made to provide improved damping by interconnecting multiple engine mounts. Thus, for example, in U.S. Pat. No. 2,038,968 to Summers an engine mount is shown in which an elastomeric peripheral wall together with rigid end walls defines a fluid-filled chamber. A helical spring is embedded in the elastomeric wall for reinforcement and damping effect, while an additional damping mode is said to be provided by virture of a conduit providing fluid communication between the fluid-filled chamber of one and another such engine mount. A similar mounting system is suggested in U.S. Pat. No. 2,705,118 to Beck, wherein rigid supporting and supported members are interconnected by a body of resilient elastomer. The elastomeric body, together with the supporting member defines a fluid-filled chamber which is so designed as to expand or contract as the supported and supporting members vibrate toward and away from each other. The chambers are said to be filled with hydraulic brake fluid and it is suggested that damping of torsional vibration can be achieved by a fluid flow restrictor valve interposed in the connecting line between the liquid-filled chambers. U.S. Pat. No. 1,655,204 to Stevens is directed to a vehicle suspension means employing a fluid communication line between mounting devices.

SUMMARY OF THE INVENTION

According to the present invention, an assembly for mounting a vibrating body to a support structure comprises at least one mount which has a chamber which, in use, is fluid-filled, and at least one vacuum accumulator in fluid communication with each such mount. Optionally, two or more of the mounts are connected to the same vacuum accumulator. Also, although each of the mounts of the mounting assembly of the invention is connected to at least one (and, typically, only one) vacuum accumulator, it should be recognized that additional mounts such as those of any well known design can be used in conjunction therewith to mount a given body to a support structure.

Each mount according to the invention comprises:

a housing comprising a substantially rigid wall with a first opening therethrough and a first elastomeric body sealingly bonded to the wall to form a fluid-tight closure of such first opening, the housing defining an elasticly expandable fluid-tight chamber with a first port, such chamber being in fluid communication through such first port with at least one vacuum accumulator;

means for rigidly attaching the housing wall to either the vibrating body or the support structure; and means for attaching the mount to the other of the vibrating body and support structure, which means is fixedly coupled to the aforesaid elastomeric body.

Each vacuum accumulator comprises an accumulator housing defining a fluid-tight vacuum chamber with a fluid port and a pressure regulation port. The fluid port is in fluid communication with the aforesaid first port of the mount chamber through a fluid conduit forming fluid-tight connections with such ports. The pressure regulation port is adapted to be in communication with means for regulating fluid pressure within the vacuum chamber.

According to a preferred embodiment of the present invention, an assembly for mounting an internal combustion engine to a motor vehicle support structure comprises a plurality of mounts and is adapted to damp or isolate vibrations transmitted to or originating in the engine. At least one of such mounts is as defined above and is connected to a vacuum accumulator as defined above.

The invention is particularly advantageous in providing a mount having a selectively variable rate. That is, for low amplitude, low frequency vibrations, with the vacuum chamber vented to atmosphere, fluid (generally liquid) within the mount chamber, conduit and vacuum chamber acts as a spring mass which is believed to resonate at the vibration frequency of the mounted body and thereby to isolate such vibration. By selection of proper component dimensions and physical properties (such as durometer of the elastomeric body of the mount), easily determined empirically according to well known engine mount design principles, the mount can be "tuned", that is, the vibration frequency (actually, frequency range) can be selected at which the fluid will resonate as a single mass and, so, isolate the mounted body from the support structure at such selected frequency. Thus, for example, a mounting assembly according to the invention employing one or more mounts as above-described, can be employed to mount an engine in a motor vehicle. The mounts can be tuned to isolate from the vehicle body (and, hence, the passenger compartment) the low frequency, low amplitude vibration generated by the engine while idling. In this mode the mounts are "soft", that is, they have a low apparent rate. Heretofore, soft engine mounts would not be used in motor vehicles, notwithstanding the improved passenger comfort while the engine was idling, due to the requirement of a hard, high rate, i.e. relatively stiff engine mount, to withstand and to effectively damp and isolate the large amplitude vibrations and displacements encountered during normal use of a motor vehicle. Such large amplitude vibrations include torque displacements during acceleration, vertical displacements due to potholes, etc., and the like. According to a most significant feature and advantage of the present invention, however, it provides not only a low apparent rate to isolate vibrations such as engine idling vibrations, but also a high rate to effectively damp and isolate large amplitude vibrations such as engine vibrations and displacements during acceleration and normal driving of a motor vehicle. Furthermore, a certain high-rate-effect described below is eliminated by applying vacuum to the vacuum accumulator, which prevents or substantially diminishes the spring mass effect of the fluid. That is, it prevents the fluid from resonating. Alternatively, above atmospheric pressure can be charged to the vacuum accumulator to similarly prevent or substantially diminish the spring mass effect of the fluid while simultaneously further hardening, i.e. stiffening the mount to increase its apparent rate.

Additional features and advantages of the invention will be apparent from the following description of preferred embodiment and the illustrations thereof.

BRIEF DESCRIPTION OF THE DRAWINGS

The invention will now be described with reference to the accompanying drawings in which.

DESCRIPTION OF PREFERRED EMBODIMENTS

The invention provides a so-called fluid-active mount assembly in which a liquid within the assembly is selectively employed to produce in the mount a changeable rate. The mount is so designed and constructed, that absent the effect of the liquid within the mount assembly the mount is relatively stiff and correspondingly durable to withstand a use environment such as that of an engine mount for a motor vehicle. The liquid within the mount assembly, however, acts as a spring mass to change the apparent rate of the mount for a selected vibration frequency. That is, the mount can be tuned such that the spring mass effct of the liquid reduces its apparent rate to effectively isolate vibrations at or near a given frequency such as, for example, to isolate engine idle vibrations from the passenger compartment of a motor vehicle. Unfortunately, an inherent mount stiffening, that is, an increase in the apparent rate of the mount (with a correlative increase in undesirable vibration transmissability) is found to be caused by the same spring mass effect at frequencies somewhat higher than those for which the mount is tuned (such as, for example, at motor vehicle engine vibration frequencies experienced during acceleration from idle to typical driving speeds). According to another aspect of the present invention, however, this undesirable rate increase effect is avoided, without loss of the desirable rate lowering in the frequency range for which the mount is tuned, by use of a vacuum accumulator in fluid communication with the liquid of the mount assembly, as further described and discussed below.

Figure 1:
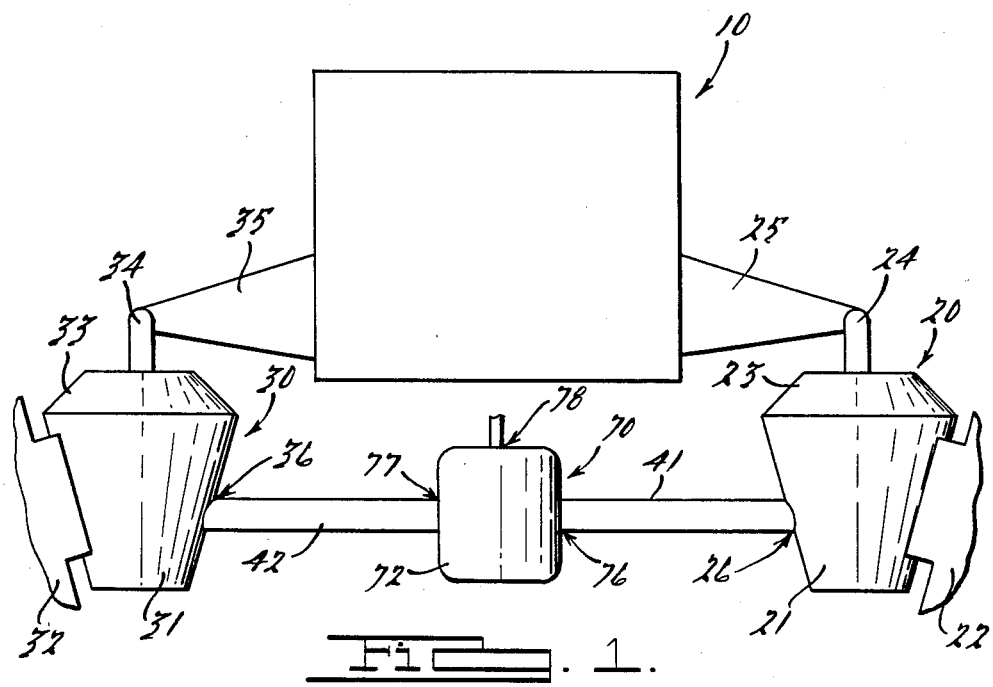
FIG. 1 is a diagrammatic front elevation of an assembly according to the invention, in assembly with a mounted body.
Figure 2:
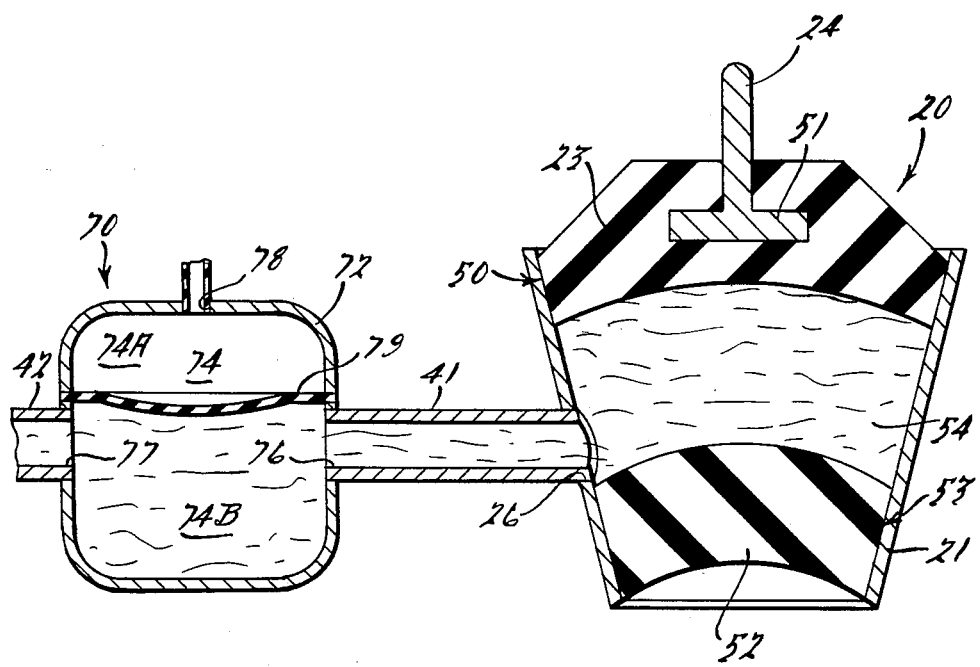
FIG. 2 is a view in cross-section of a fluid-filled mount and vacuum accumulator of the assembly of FIG. 1.

The assembly for mounting a vibrating body according to the present invention is especially suitable for use as an engine mounting system for a motor vehicle and the following discussion will describe the invention in such context. Referring now to the drawings, wherein the same number is used for a given feature in each of the drawings in which it appears, FIGS. 1 and 2 illustrate an engine mounting system comprising an engine 10 supported by a pair of engine mounts 20 and 30 connected to a common vacuum accumulator 70 via conduits 41 and 42, respectively. Engine mounts 20 and 30 each comprises a housing having a rigid wall 21,31, respectively, forming a frustro-conical sleeve open at the upper, larger diameter end. The housing preferably also has a second opening, as shown, at the lower, smaller diameter end. The housings are rigidly attached to a support member 22,32 comprising an element of a vehicle frame or body. Each of the engine mount housings further comprises a deformable elastomeric body 23,33 sealingly bonded to the inner surface of the rigid housing wall at the larger diameter end thereof to form a fluid-tight closure of that end of the housing. Rigid attachment means 24,34 are fixedly coupled to the elastomeric body 23,33, respectively, and are adapted to fixedly engage a member 25,35 which is rigidly integral with the engine. Typically, such attachment means comprises a hardened metal post which is molded into the elastomeric body with a flange or washer, as shown, connected to the post and embedded in the elastomeric body. The housing of the engine mounts each provides a port 26,36, respectively. Conduit 41 is sealingly attached to mount 20 at port 26 and conduit 42 is sealingly attached to mount 30 at port 36. Such conduits provide fluid communication between the engine mounts and the vacuum accumulator 70.

Vacuum accumulator 70 comprises housing 72 defining a fluid-tight vacuum chamber 74 with fluid ports 76,77 and a pressure regulation port 78. Chamber 74 is in fluid communication with mount 20 through port 76 via conduit 41 and with mount 30 through port 77 via conduit 42. The mount chamber can be either partially liquid and partially gas-filled or, more preferably, entirely liquid filled; but, in any event, both the mount chamber and the the vacuum chamber should be liquid-filled to a level sufficient to maintain the conduits liquid filled. Obviously, the connections of the conduits to the ports should be fluid-tight. It should be recognized that each mount can be used with its own vacuum accumulator and, alternatively, that more than one mount can be connected to a single vacuum accumulator. In fact, multiple mounts and vacuum accumulators can be interconnected in any combination meeting the performance requirements and space limitations of the particular application. Also, mount assemblies of the invention can be used in conjunction with other types of mounting means to mount a body to a support structure.

Figure 3:
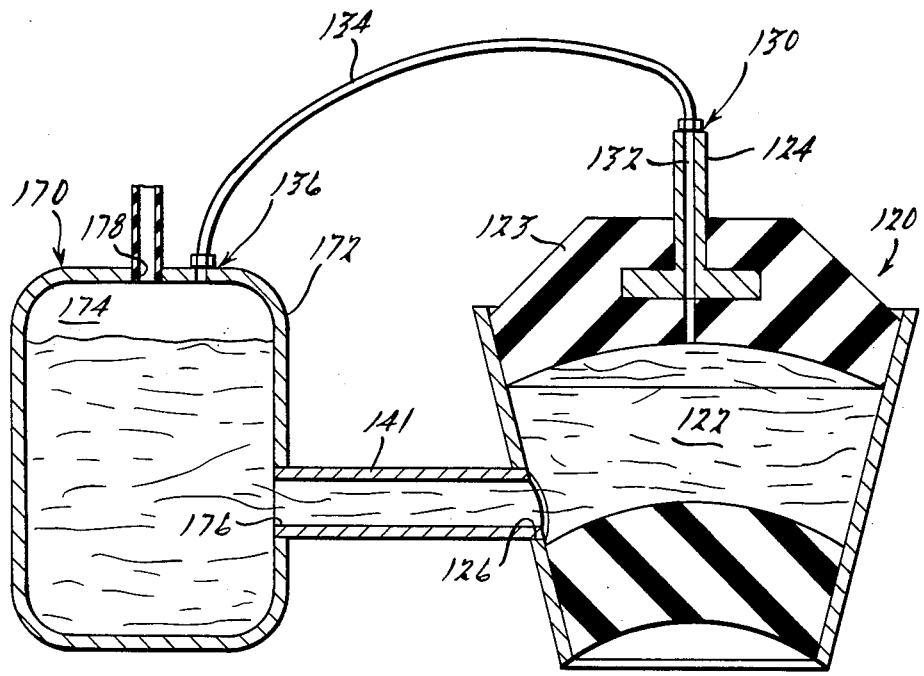
FIG. 3 is a perspective view of an assembly according to the invention, shown with a mounted body.

According to the present understanding of the mode of operation of the invention, discussed further below, it generally is preferred that the mount chamber be entirely liquid-filled. However, as a result of alternately drawing a vacuum in the vacuum accumulator and venting it to the atmosphere during use of the mounting assembly, the liquid therein can entrap gas bubbles which then can travel into the mount chamber, collect at the top of the mount chamber, and form a layer of gas between the fluid in the chamber and the upper elastomeric member. This would affect the apparent rate of the mount and could diminish its ability to isolate and damp vibrations. Accordingly, the vacuum accumulator preferably comprises means to prevent or remove any gas layer in the mount chamber. One such means is shown in FIG. 2. Specifically, the vacuum chamber of the accumulator is divided by an elastically deformable diaphragm 79 into an air-tight first sub-chamber 74A in communication with the aforesaid pressure regulating means via port 78 and a fluid-tight second sub-chamber 74B in communication with the aforesaid fluid ports 76,77. An alternative, preferred means is illustrated in FIG. 3, wherein vacuum accumulator 170 comprises housing 172 defining a fluid-tight chamber 174 with a fluid port 176 and a pressure regulation port 178. Chamber 174 is in fluid communication with the chamber 122 of mount 120 through port 176 of the vacuum chamber via conduit 141 to port 126 of the mount chamber. Rigid attachment means comprises a post 124 fixedly embedded in elastomeric body 123 and is adapted to engage a member (not shown) which is rigidly integral with the engine. A bleed valve 130 comprises passageway 132 which extends through post 124 and elastomeric body 123 to the top (gravitationally) of mount chamber 122. Any gas bubbles which pass from the vacuum chamber to the mount chamber via conduit 141 collect at the top of the mount chamber and thence are drawn, each time a vacuum is drawn in the vacuum chamber, via bleed valve conduit 134 through port 136 to the vacuum chamber 174. Any fluid drawn through conduit 134 simply joins the main fluid body in the vacuum chamber. It will be recognized that the fluid level in the vacuum mount would be as high or higher (gravitationally) than the top of the mount chamber according to this embodiment.

Referring again particularly to FIG. 2 regarding engine mount 20, deformable elastomeric body 23 is seen to be sealingly bonded at surface 50 to the frustro-conical wall 21 at the upper, larger diameter open end thereof. Attachment means 24 comprises a metal post with an anchoring flange 51 embedded in the elastomeric body 23. Preferably, the attachment post is molded into the elastomer so as to be bonded thereto. A second elastomeric body 52 is seen to form a fluid-tight closure of the lower, smaller diameter opening of the wall 21. That is, the second elastomeric body 52 is continuously sealed to the rigid housing wall at surface 53. Conduit 41 is attached to the housing at port 26. It can be seen that the two elastomeric bodies 23,52 and the rigid housing wall cooperate to define a chamber 54, which chamber is expandable and contractible upon deformation of the two elastomeric bodies. Thus, for example, in response to hydraulic pressure through conduit 41 the chamber 54 can expand and be pressurized. The effective rate of the mount would thereby be increased. Accordingly, the rate of the mount can be controlled in this way by controlling a source of pneumatic pressure connected to the vacuum accumulator through port 78.

In general, for use as an engine mount for a motor vehicle, it is highly desirable that the mount be stiff, i.e. have a high spring rate, to withstand the large amplitude vertical and torsional dislocations and vibrations experienced under normal driving conditions. Typically, however, mounts having a high rate perform poorly at damping or isolating low frequency vibrations generated by the engine while idling. The result is an undesirably high noise and vibration level in the vehicle passenger compartment. According to the present invention a high rate mount is used which nevertheless provides good isolation and damping during engine idling. Specifically, while not wishing to be bound by theory, it currently is understood that with pressure in the vacuum accumulator at or near atmospheric pressure. liquid in the mount chamber, conduit and vacuum accumulator is free to resonate as a single mass, so-called spring mass. Thus, in use as an engine mount for a motor vehicle, within a certain pre-selected engine vibration frequency range, the liquid would resonate as a spring mass in such phase relationship that the apparent rate of the mount is substantially lowered for such frequency range. The observed effect is to make the mount softer and better able to isolate and damp such vibrations. By selection of appropriate component dimensions and/or other system parameters, the mount can be "tuned" such that the fluid column resonates at the frequency of a major component of vibration generated by the engine while idling. In this way, the aforesaid spring mass effect can be maximized for such engine idling vibrations. The result is that a relatively high rate, i.e. stiff, engine mount—highly desirable for withstanding the large amplitude vibration and dislocations experienced under normal driving conditions—is made to have a low apparent rate, i.e. to be relatively soft, for improved performance under engine idle conditions. The frequency for which the mount is tuned has been discovered to depend particularly on the volume of liquid in the fluid conduit between the mount and the vacuum accumulator, and on the ratio of the cross-sectional area of the mount chamber (analogizing the elastomeric distortion of the mount chamber to the travel of a piston in a cylinder) to the cross-sectional area of the fluid conduit. Typically, for use as a motor vehicle engine mount, for example, the fluid conduit dimensions could be about 10 to 20 inches (length) and about ½ to 1 inch (bore diameter).

Figure 6:
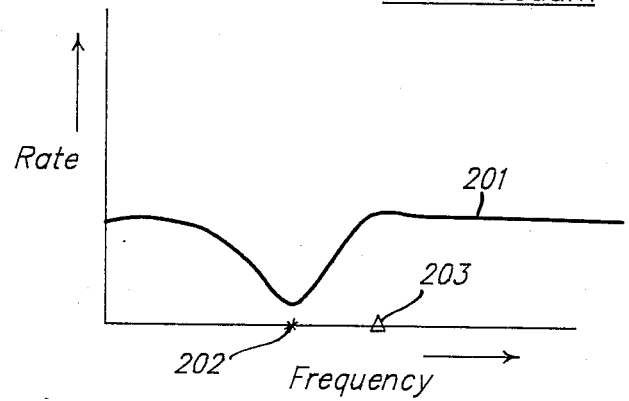
FIG. 6 is a graph showing the rate of the same amount as FIG. 5 as a function of frequency with application of vacuum.

The aforesaid spring mass effect on the apparent rate of the mount is roughly sinusoidal. It lowers the rate for a certain frequency range, i.e., for a small range of vibration frequencies on either side of the exact frequency for which the mount is tuned. As vibration frequency increased beyond this range, however, the spring mass effect is observed to increase mount stiffness even beyond that which it would have without influence of the fluid column. Thus, in the higher frequency range, (which would, for example, be experienced during acceleration of a motor vehicle from idle to normal driving speeds) the vibration and noise level in the passenger compartment would disadvantageously be increased by the spring mass effect of the fluid column. Thus, for example, an engine mount according to the invention which is tuned to maximize apparent rate reduction at about 25 hertz, might typically have a maximum apparent rate increase effect at about 30 hertz. Such apparent rate increase effect would diminish at higher frequencies but might not be entirely eliminated even at 100 hertz, which corresponds to second order engine vibration frequencies at highway driving speeds. As noted above, however, it is an especially novel and advantageous aspect of the invention that the application of vacuum to the vacuum chamber disables the spring mass effect such that the mount stiffness is returned substantially to that of the mount without effect of the fluid column. This is illustrated in FIGS. 5 and 6, wherein:

line 201 shows the apparent rate of the mount;
frequency 202 is the engine idle frequency;
frequency 203 in FIG. 6 is the frequency at which vacuum is applied; and
the cross hatched area 204 is the increase in apparent rate due to additional spring mass effect.

Figure 5:
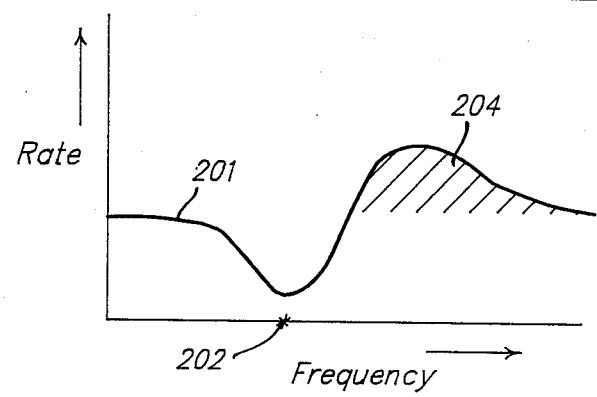
FIG. 5 is a graph showing the rate of a mount according to the invention as a function of frequency without application of vacuum.

It can be seen in FIGS. 5 and 6 that application of vacuum when predominant vibration frequencies are beyond the range for which the mount is tuned (i.e., when predominant engine vibration frequencies have reached a higher range in which spring mass effect actually would increase the apparent rate beyond the unmodified rate of the mount) avoids the unwanted apparent rate increase. Without this feature of the invention, such increase in the apparent rate beyond the actual rate of the mount (i.e., the rate without fluid mass effect) would result in unwanted transmission of engine vibration to the vehicle body and passenger compartment. Thus, the invention can provide advantageously low mount stiffness at engine idle vibration frequencies without the penalty of disadvantageously high mount stiffness at higher vibration frequencies.

Figure 4:
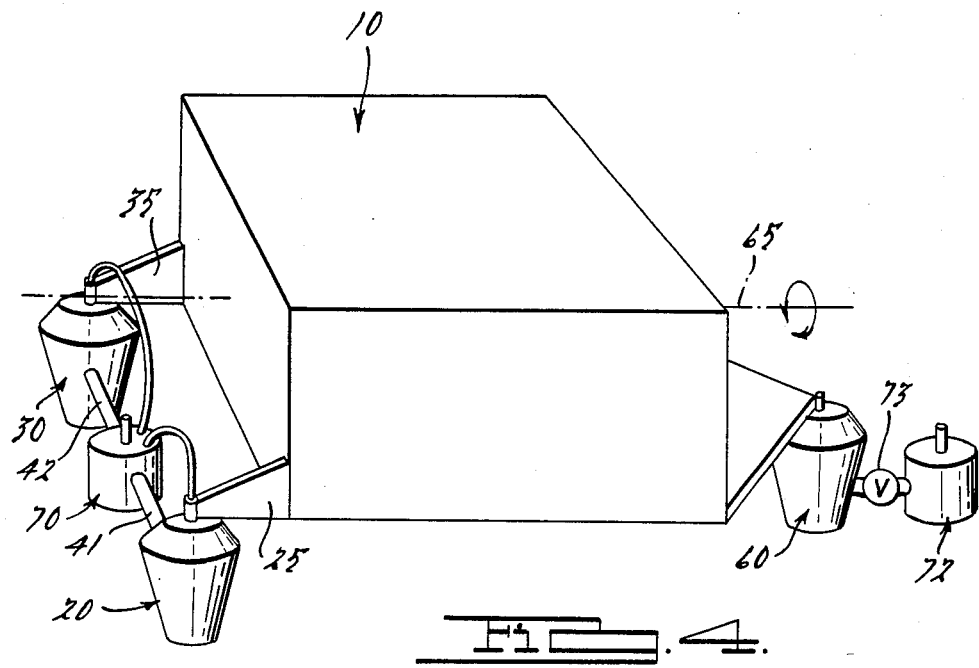
FIG. 4 is a diagrammatic perspective view of the invention according to an alternative embodiment.

A preferred embodiment of the invention is illustrated schematically in FIG. 4, wherein engine 10 is mounted by three engine mounts 20, 30, 60 to a motor vehicle support structure (not shown). The engine has a primary roll axis 65 and it can be seen that engine mounts 20 and 30 are positioned in a plane substantially orthogonal to the roll axis. Thus, upon torsional displacement of engine 10 about roll axis 65, one of the engine mounts 20 and 30 will be put in compression and the other will be put in tension. The engine mounts are constructed as shown in FIG. 2, having two elastomeric bodies of differing durometer. Upon displacement of the engine, the upper elastomeric body of each engine mounts will be displaced and, thereby contribute to the damping of such displacement of the engine. Fluid flow through the conduits between the mounts and the vacuum accumulator also can contribute hydraulic damping. Furthermore, if such conduits are sized to permit a flow of fluid therethrough at a maximum rate (in response to a large amplitude displacement of the engine), which is insufficient to prevent the build-up of pressure within the mount chamber, then the lower, preferably higher damped, elastomeric body will be deformed by such mount chamber pressure and, so, also contribute to damping of the displacement. Proper sizing of the conduit to provide such pressure build-up within the mount is a function of both tube length and diameter and of fluid rheology. It will be within the ability of those skilled in the art in view of the present disclosure to select suitable conduit dimensions and fluid properties to provide such fluid build-up. The conduit extending between engine mount 60 and vacuum accumulator 72 is seen to comprise a valve 73 adapted to control fluid vacuum flow through said tube. Preferably, the weight of the engine is supported by the elastomeric material in compression rather than in tension.

Suitable materials for the various components of the mounting system of the invention will be apparent to the skilled of the art in view of the present disclosure. Generally, the selection of suitable materials will depend in large part upon the intended use of the mounting system. For use in mounting an internal combustion engine in a motor vehicle, the elastomeric body forming the closure of the larger diameter opening of the housing, in which is embedded the attachment post, preferably comprises a material such as rubber or a synthetic elastomeric material having hysteretic damping value of about 6–16% of rate, where rate is defined as the pounds force per inch of elastomeric deformation of the material. In a typical motor vehicle application, each engine mount might bear, for example, about 100–200 lbs. of engine weight and have a rate of from about 500 lbs. per inch to about 5000 lbs. per inch deformation, depending upon the vehicle noise, vibration and ride harshness characteristics desired. It will be understood by those skilled in the art that the rate is determined not only by the durometer of the elastomeric material. but also by its physical shape, location of attachment, and the direction of forces applied.

The second elastomeric body, that is, the one to which the engine attachment means is not directly attached, can be of higher damped elastomeric material such as for use in motor vehicle engine mounts, for example, styrenebutyl rubber or other synthetic elastomeric material having a hysteretic damping value of about 7–19% of rate. Such higher damping elastomer, however, may also damp the resonance from which the aforesaid apparent rate reduction is derived. This would undesirably reduce the amount of apparent rate reduction.

The fluid conduit interconnecting the engine mount(s) with the vacuum accumulator(s) can be any of a wide variety of materials readily apparent to the skilled of the art, of which many are readily commercially available. Again, the choice of materials and dimensions will depend largely upon the application in which the mounting system is to be used. Typical for use in a motor vehicle in an engine support application would be an inside tube diameter of about ¼ inch to about 1 inch. The conduit can be constructed of the same materials presently used in motor vehicles for hydraulic fluid lines, for example brake lines and the like. Preferably the tube does not significantly expand under pressure, such that high amplitude tortional displacements of a body suspended as shown in FIG. 3 would cause sufficient pressure increase within the fluid-filled chamber to deform the higher damped elastomeric body, whereby such torsional displacement would be damped, as discussed above. Numerous suitable materials are available for the housing of the mounting device. Thus, for example, sheet steel, filament reinforced composite material, for example graphite reinforced epoxy and the like, and aluminum alloys are commercially available and well known to the skilled of the art. The liquid phase of the fluid filling the mount chambers and the interconnecting conduit should be inert and compatible with the materials of the mount. Numerous suitable liquids are commercially available and will be apparent to the skilled of the art in view of this disclosure. Thus, for example, for use in a motor vehicle application ethylene gylcol would be suitable. Typically, the liquid would have the viscosity of about 100–200 lbs.(mass)/ft. sec.$\times 10^4$.

INDUSTRIAL APPLICABILITY

From the foregoing disclosure it will be apparent that the present invention has applicability as an engine support system for motor vehicles and also as a support system for like applications wherein a body subject to vibrations is damped and isolated from a supporting structure.

I claim:

1. An assembly for mounting a vibrating body to a support structure, said assembly comprising a mount and a vacuum accumulator, said mount comprising:
    (a) a mount housing comprising a substantially rigid wall with a first opening therethrough and a first elasticly deformable body sealingly bonded to said wall to form a fluid-tight closure of said first opening, said mount housing defining an elasticly expandable fluid-tight mount chamber with a first port, said mount chamber being in fluid communication, through its said first port via a fluid conduit, with said vacuum accumulator;
    (b) means for rigidly attaching said rigid wall to one of said vibrating body and said support structure; and
    (c) means for attaching said mount to the one of said body and said support structure to which said rigid wall is not rigidly attached, said attaching means being fixedly coupled to said first elasticly deformable body;

wherein said vacuum accumulator comprises an accumulator housing defining a fluid-tight vacuum chamber with a fluid port and a pressure regulation port, said fluid port being in fluid communication with said first port of said chamber through said fluid conduit forming a fluid-tight connection with said first port and with said fluid port, the pressure regulation port of said vacuum accumulator being adapted to be in fluid communication with means for regulating pressure within said vacuum chamber.

2. The assembly of claim 1, wherein said first elasticly deformable body has a hysteretic damping value of about 6%–16% of rate, where rate is the ratio of applied force to amount of elastic deformation of the body.

3. The assembly of claim 1, wherein said mount housing further comprises a second deformable elastomeric body of higher hysteretic damping value than said first elastically deformable body, said second elastomeric body being sealingly bonded to said housing to form a fluid-tight closure of a second opening through said housing wall remote from said first opening.

4. The assembly of claim 3, wherein said second elastomeric body has a hysteretic damping value of about 7%–19% of rate, where rate is the ratio of applied force to amount of elastic deformation of the body.

5. The assembly of claim 1, wherein said fluid conduit comprises a substantially rigid tube.

6. The assembly of claim 1, wherein said fluid conduit comprises a tube and a valve in said tube adapted to control fluid-flow through said tube.

7. The assembly of claim 1, wherein said vacuum accumulator further comprises an elastically deformable diaphragm dividing said vacuum chamber into an air-tight first sub-chamber in fluid communication with said pressure regulation port, and a liquid-tight second sub-chamber in fluid communication with said fluid port.

8. The assembly of claim 1, further comprising a bleed valve and bleed valve conduit together providing fluid communication between said mount chamber and said vacuum chamber.

9. The assembly of claim 1, comprising at least two said mounts, each in fluid communication with said vacuum accumulator.

10. The assembly of claim 1, comprising at least two said mounts and at least two said vacuum accumulators, each said mount being in fluid communication with at least one said vacuum accumulator and each said vacuum accumulator being in fluid communication with at least one said mount.

11. An engine mounting assembly mounting an engine to a support structure of a motor vehicle, said assembly comprising, in addition to said engine and said support structure:
(I) a plurality of engine mounts, at least one said mount being a fluid-active engine mount comprising:
(a) a mount housing comprising a substantially rigid wall with a first opening therethrough and a first elasticly deformable body sealingly bonded to said wall to form a fluid-tight closure of said first opening, said housing defining an elasticly expandable fluid-tight mount chamber with a first port;
(b) means for rigidly attaching said rigid wall to one of said engine and said support structure; and
(c) means for attaching said fluid-active engine mount to the one of said engine and said support structure to which said rigid wall is not rigidly attached, said attaching means being fixedly coupled to said first elasticly deformable body;
(II) at least one vacuum accumulate, said mount chamber being in fluid communication through said first port with at least one said vacuum accumulator, said vacuum accumulator comprising an accumulator housing defining a fluid-tight vacuum chamber with a fluid port and a pressure regulation port, each in fluid communication with said vacuum chamber;
(III) means for regulating pressure within said vacuum chamber, said pressure regulation means being in fluid communication with said pressure regulation port; and
(IV) a fluid conduit between said mount chamber and said vacuum chamber; said mount chamber and said fluid conduit and at least a portion of said vacuum chamber being liquid-filled.

12. The engine mounting assembly of claim 11 comprising at least two said fluid active engine mounts, each in fluid communication with the same said vacuum accumulator.

13. The engine mounting assembly of claim 11 comprising at least two fluid active engine mounts and at least two said vacuum accumulators, each said engine mount being in fluid communication with a different one of said vacuum accumulators.

14. The engine mounting assembly of claim 11, wherein said means for regulating pressure within said vacuum chamber comprises means for selectively drawing vacuum in said vacuum chamber and for venting said vacuum chamber to the atmosphere.

15. The engine mounting assembly of claim 11, wherein said means for regulating pressure within said vacuum chamber comprises means for selectively drawing a vacuum in said vacuum chamber and for pressurizing said vacuum chamber to pressures above atmospheric pressure.

16. An engine mounting assembly mounting an engine to a support structure, said assembly comprising, in addition to said engine and said support structure:
(I) at least two fluid-active engine mounts, each comprising:
(a) a housing comprising (i) a substantially rigid wall with a first opening therethrough, (ii) a first elasticly deformable body sealingly bonded to said wall to form a fluid-tight closure of said first opening, said first elasticly deformable body having a hysteretic damping value of about 6%-16% of rate, where rate is the ratio of applied force to amount of elastic deformation of the body, and (iii) a second deformable elastomeric body sealingly bonded to said housing to form a fluid-tight closure of a second opening through said housing wall remote from said first opening, said second elastomeric body having a hysteretic damping value of about 7%-19% of rate, said housing defining an elasticly expandable fluid-tight mount chamber with a first port;
(b) means for rigidly attaching said rigid wall to one of said engine and said support structure; and
(c) means for attaching said mount to the one of said engine and said support structure to which said rigid wall is not rigidly attached, said attaching means being fixedly coupled to said first elasticly deformable body;
(II) at least two vacuum accumulators, each comprising an accumulator housing defining a fluid-tight vacuum chamber with a fluid port and a pressure regulation port, the mount chamber of each said engine mount being in fluid communication through its said first port, via a fluid conduit comprising a substantially rigid tube, with one each of said vacuum accumulators through said vacuum accumulator's fluid port;
(III) means for selectively regulating fluid pressure within said vacuum chamber of each said engine mount, comprising means for selectively drawing a vacuum in said vacuum chamber and for venting said vacuum chamber to the atmosphere, said pressure regulating means being in fluid communication with said vacuum chamber through said pressure regulation port; and
(IV) a bleed valve in fluid communication with said mount chamber and a bleed valve port in fluid communication with said vacuum chamber and a bleed valve conduit providing fluid communication between said mount chamber and said vacuum chamber through said bleed valve and said bleed valve port; wherein said mount chamber and said fluid conduit and at least a portion of said vacuum chamber are liquid-filled.

* * * * *